March 13, 1956 C. E. ADAMS 2,737,929
PILOT CONTROL MECHANISM FOR HYDRAULIC APPARATUS
Filed Feb. 6, 1952 4 Sheets-Sheet 1

INVENTOR.
CECIL E. ADAMS
BY
Herschel C. Omohundro
attorney

March 13, 1956  C. E. ADAMS  2,737,929
PILOT CONTROL MECHANISM FOR HYDRAULIC APPARATUS
Filed Feb. 6, 1952  4 Sheets-Sheet 2
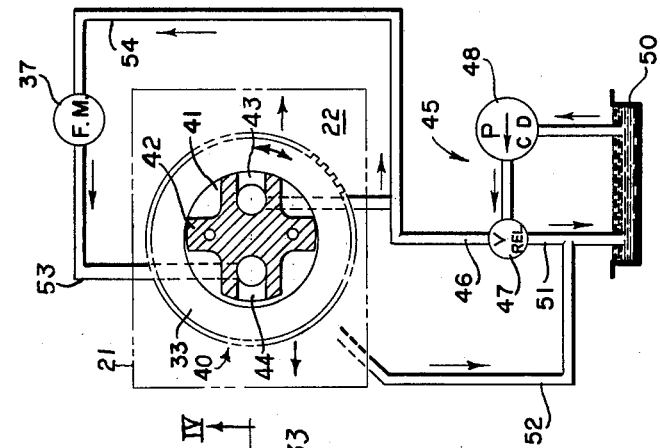
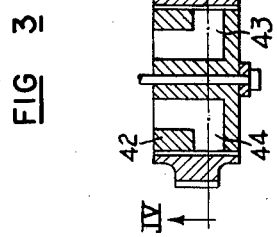
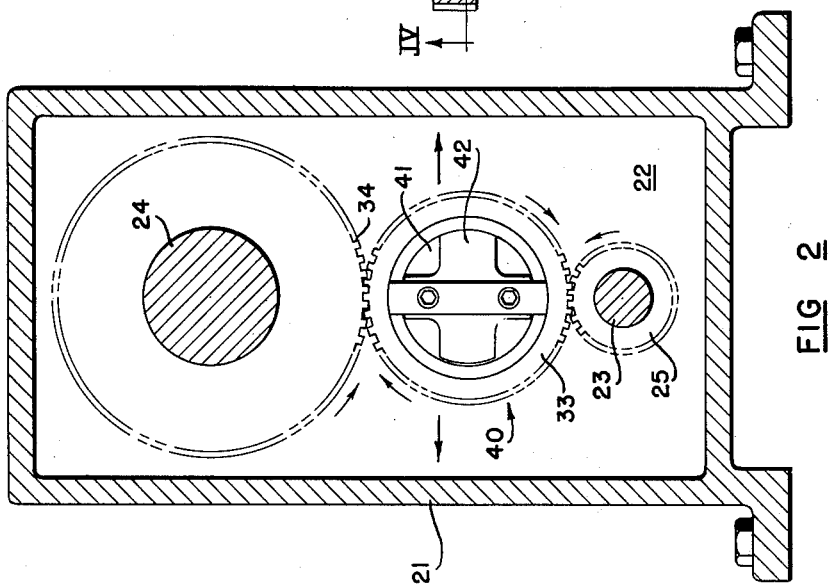
INVENTOR.
CECIL E. ADAMS
BY
Herschel E. Omohundro
attorney March 13, 1956  C. E. ADAMS  2,737,929
PILOT CONTROL MECHANISM FOR HYDRAULIC APPARATUS
Filed Feb. 6, 1952  4 Sheets-Sheet 3

INVENTOR.
CECIL E. ADAMS
BY
Herschel C. Omohundro
Attorney

March 13, 1956     C. E. ADAMS     2,737,929
PILOT CONTROL MECHANISM FOR HYDRAULIC APPARATUS
Filed Feb. 6, 1952     4 Sheets-Sheet 4

INVENTOR.
CECIL E. ADAMS
BY
Herschel E. Omohundro
attorney

United States Patent Office 2,737,929
Patented Mar. 13, 1956

2,737,929

PILOT CONTROL MECHANISM FOR HYDRAULIC APPARATUS

Cecil E. Adams, Columbus, Ohio, assignor to The Denison Engineering Company, Columbus, Ohio, a corporation of Ohio Application February 6, 1952, Serial No. 270,131

3 Claims. (Cl. 121—39)

This invention relates to a pilot control mechanism for hydraulically operated power transmission devices.

One of the objects of this invention is to provide a relatively small, sensitive pilot device for governing the operations of a large, heavy capacity, power transmitting unit.

Another object of this invention is to provide a pilot power transmitting device which may be caused to follow a predetermined pattern of operations in respect to starting, accelerating, decelerating, stopping, dwelling and repeating and in doing so to cooperate in the actuation of a control means for a larger heavy capacity power transmission, the latter in its operation also cooperating in the actuation of the control means so that the large heavy capacity, power transmission will closely follow the pattern of operation of the pilot power transmitting device.

A further object of this invention is to provide a control mechanism having a device for controlling the flow of motivating power to a prime mover and means actuated in concert by the prime mover and a pilot prime mover so that the first prime mover will duplicate the pattern of operations of the pilot prime mover.

It is a still further object of the invention to provide a control mechanism having a valve device for controlling the flow of fluid under pressure to a hydraulic power transmission mechanism and motion transmitting connections between parts of the valve device and the hydraulic transmission and between the former and a driving mechanism so that the valve device will be actuated by both the transmission and driving mechanism to accurately control the operations of the hydraulic transmission to make it duplicate the operations of the driving mechanism.

An object of the invention, also, is to provide a control mechanism having a casing in which pilot and follower gears are journalled with an idler gear arranged therebetween, the idler gear constituting a part of a flow controlling device and being operated by the variations in rates of rotation of the pilot and follower gears to control the flow of fluid pressure to a fluid motor which drives the follower gear to the end that the pattern of operation of the fluid motor will be the same as that of the motor or engine which drives the pilot gear.

Another object of this invention is to provide a control mechanism having a valve which is arranged to be operated by movement of a gear disposed in meshing relationship with a pair of gears, one thereof being actuated by a pilot driving mechanism and the other being actuated by a driving mechanism to be controlled, the relation of the gears being such that force imparted by the pilot driving mechanism will cause an opening of the valve to admit fluid under pressure to the second driving mechanism to effect operation thereof. When the rate of operation of the latter reaches a predetermined speed, the valve will be operated to decrease the amount of fluid pressure being supplied to only that necessary to keep the second driving mechanism operating at such speed. If the rate of operation of the pilot driving mechanism is changed, the gear for the valve will be actuated to change the setting of the valve to compensate for such change by varying the volume of fluid under pressure supplied to the second driving mechanism.

Further objects and advantages of the present invention will be apparent from the following description, reference being had to the accompanying drawings wherein a preferred form of embodiment of the invention is clearly shown.

In the drawings:

Fig. 2 is a vertical transverse sectional view taken through the mechanism shown in Fig. 1 on the plane indicated by the line II—II of Fig. 1.

Fig. 3 is a detail horizontal sectional view taken through a portion of the mechanism shown in Fig. 1 on the plane indicated by the line III—III of Fig. 1.

Fig. 4 is a view partly in section of the mechanism shown in Fig. 3 with a diagrammatic view of the hydraulic system utilized with the control mechanism, added thereto.

Figure 1:
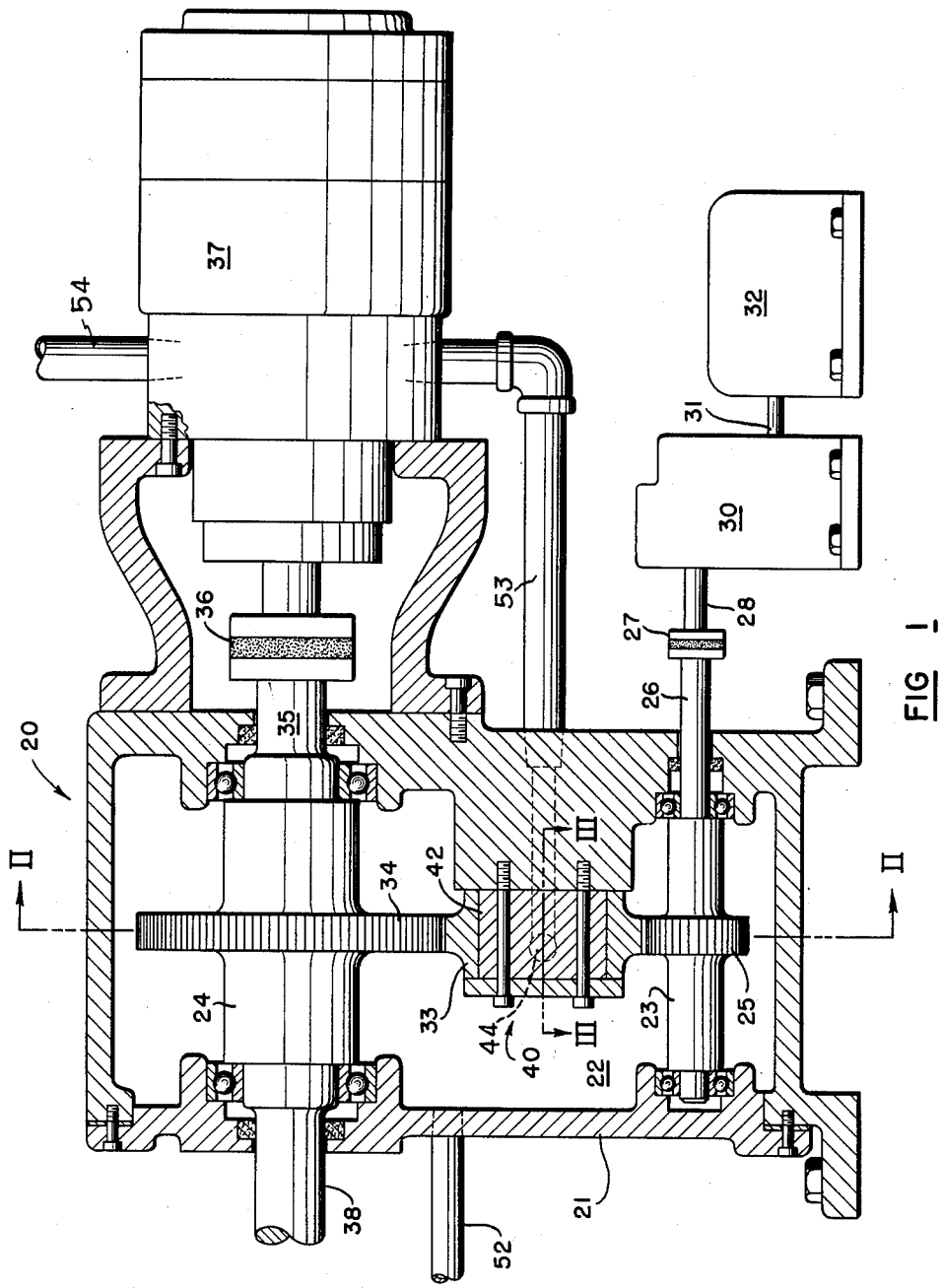
Fig. 1 is a vertical longitudinal sectional view taken through a control mechanism formed in accordance with the present invention.

Referring more particularly to the Figs. 1 to 4, inclusive, of the drawings, the numeral 20 designates apparatus which embodies the invention in its preferred form. In this form the invention includes a casing 21 which provides an oil chamber 22, the casing having a pair of transversely extending shafts 23 and 24 journalled therein. Shaft 23 is, in this form of the invention, disposed at the lower end of the casing and is provided with a gear 25. This shaft has an extension 26 projecting through the casing and connected by a clutch or coupling 27 with the driven shaft 28 of a gear mechanism 30. This mechanism has a driving shaft 31 for transmitting power from an electric motor or other suitable prime mover 32 to such mechanism. Any desired means may be provided to control the operation of the motor 32 and to cause it to follow a suitable pattern of operations.

The gear 25 is disposed in meshing relationship with an intermediate gear 33 which is also journalled in the casing 21, the intermediate gear in turn meshing with a main gear 34 carried by and rotatable with the shaft 24. Shaft 24 has an extension 35 which is also connected by a clutch or coupling 36 with a hydraulic motor 37, which is of relatively large size and capable of performing driving operations requiring predetermined force. The shaft 24 also has an extension 38 projecting from the casing 21 to perform useful work. One of the objects of the invention is to cause the shaft 38 to operate according to a predetermined pattern, that is, to start, accelerate, revolve at a predetermined speed for a desired length of time, decelerate, stop and repeat the operations in the same or a different sequence, this pattern of operations being determined by the motor or prime mover 32. In other words the prime mover 32 is a pilot operating device for the larger, more powerful prime mover 37.

To secure the desired object the control mechanism is provided with a valve indicated generally by the numeral 40. The gear 33 in the first form of the invention illustrated in Figs. 1 to 4, inclusive, forms a part of such valve. This gear is provided with a circular bore 41, to receive a valve body 42 as shown in Figs. 1, 2, 3 and 4. The body 42 has a pair of ports 43 and 44 formed therein, these ports terminating at the periphery of the body on opposite sides thereof. As shown in Fig. 4, port 43 is connected with a source of fluid pressure 45 having a line 46 containing a relief valve 47 and leading from motor driven pump 48; the inlet of this pump communicates with a reservoir 50 and an exhaust line 51 from the relief valve leads to the reservoir. This exhaust line has a branch 52 leading from the casing 21. The body 42 is so constructed that the gear 33 may move relative to the body a limited degree to open or close the ports 43 and 44. Port 44 communicates by way of line 53 with the exhaust of fluid motor 37. The inlet of this fluid motor communicates through line 54 with line 46. It will be seen from the description, thus far given, that the movement of gear 33 toward or away from port 43 varies the volume of fluid flowing from the source 45 to the motor 37. If the gear 33 is moved closed to the body 42 on the side occupied by the port 43 and fluid is prevented from escaping therefrom, the entire volume of fluid from the source 45 will be caused to flow to the motor 37 to drive it at full speed.

Gear 33 is arranged between gears 25 and 34 and is in meshing engagement with both. It will be obvious that when operation of gear 25 is initiated the gear being driven in the direction indicated by the arrow in Fig. 2, gear 33 will tend to resist turning movement due to its meshing engagement with gear 34. This resistance to rotation causes the gear 33 to move laterally or to the left as viewed in Fig. 2, this movement closing port 43 and directing the entire volume of fluid from the source 45 to the fluid motor 37. This fluid will cause motor 37 to start to operate and in doing so it will cause the rotation of gear 34. As long as rotation of gear 34 is resisted with sufficient force to cause gear 25 to hold gear 33 in position to maintain port 43 closed the entire volume from the source 45 will be directed to the fluid motor 37.

In the event the load on shaft 38 is relieved, fluid motor 37 will tend to rotate at a faster rate. This tendency will cause the gear 34 to tend to drive gear 33. Since the rate of rotation of gear 33 is controlled by gear 25 the force imparted by gear 34 will move gear 33 laterally in the opposite direction or to the right as viewed in Fig. 2. This movement will open port 43 and close port 44. By opening port 43 some of the fluid from the source 45 will be permitted to escape directly into the casing 21 from which it will flow through line 52 to the reservoir 50 without passing through fluid motor 37. By so bypassing some of the fluid from the source the rate of operation of fluid motor 37 will be reduced. Also by closing port 44 the exhaust of fluid from the fluid motor will be resisted which will also tend to decrease the rate of operation of motor 37. It will be obvious from the foregoing that through the operation of valve 40 by motor 32 the operation of motor 37 will be controlled. It will also be obvious that motor 37 will follow the pattern of operation of motor 32.

Figure 5:
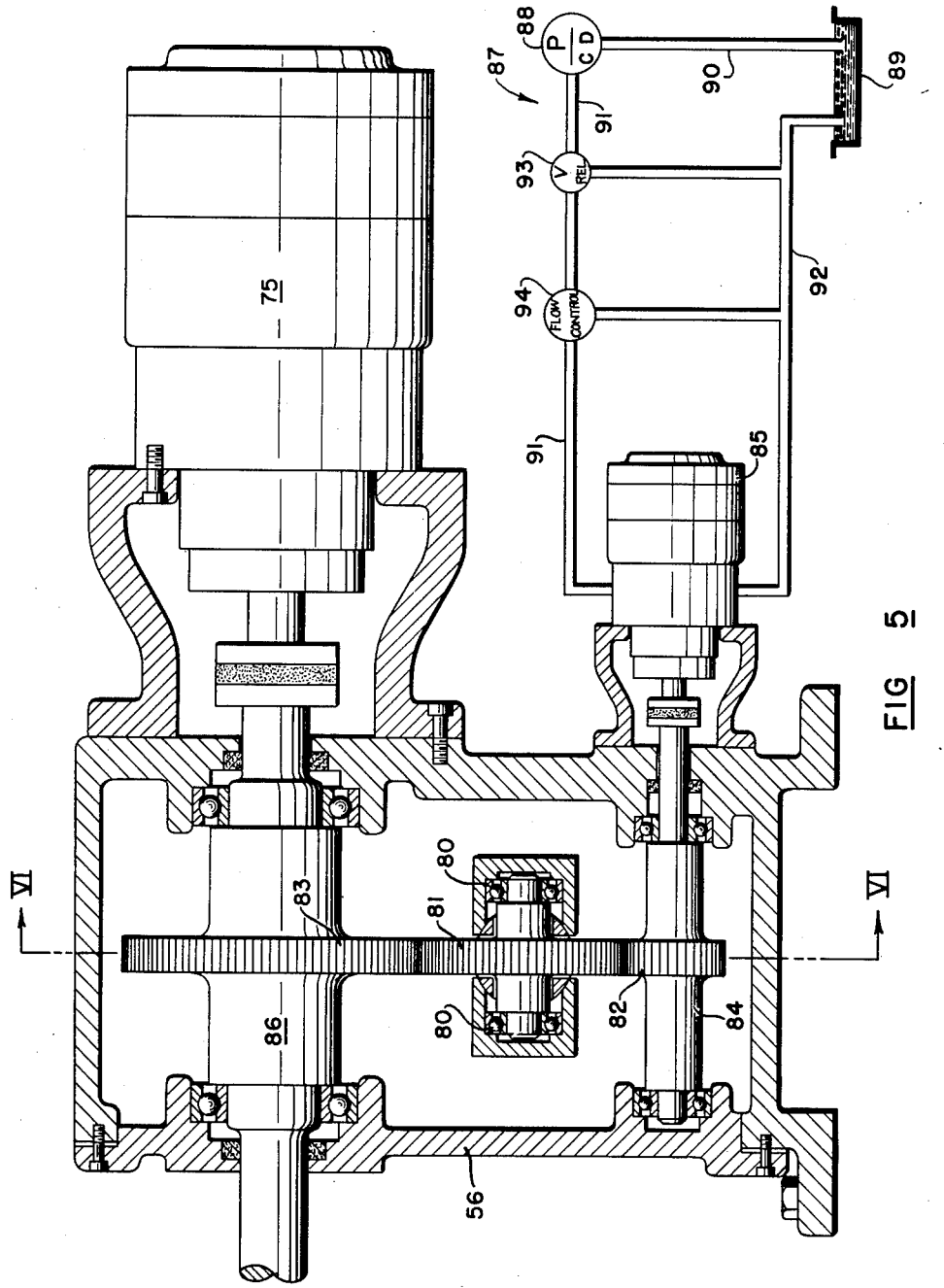
Fig. 5 is a vertical longitudinal sectional view of a modified form of a control mechanism, this view having a hydraulic circuit diagrammatically illustrated, associated therewith.
Figures 6, 7:
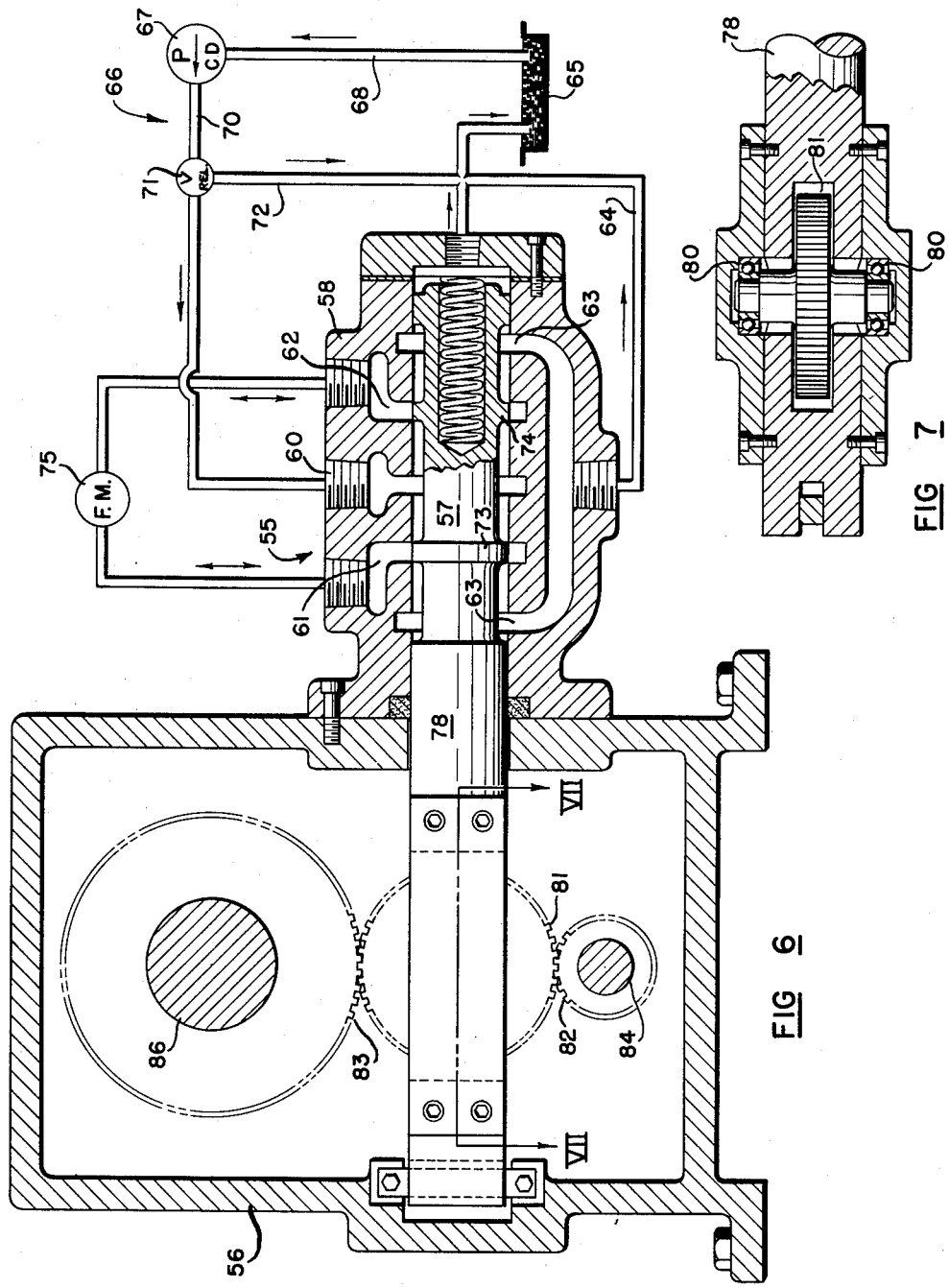
Fig. 6 is a vertical sectional view taken through the mechanism shown in Fig. 5 on the plane indicated by the line VI—VI of this figure.
Fig. 7 is a detail horizontal sectional view taken through a portion of the mechanism on the plane indicated by the line VII—VII of Fig. 6.

Valve 40 may be modified in a number of different ways or different types of valves may be substituted therefor. Figs. 5 to 7, inclusive, show a modified form of control mechanism in which a different valve is employed. This valve, which is designated generally by the numeral 55, is disposed exteriorly of the casing 56 and is in the form of a spool type valve, the valve being commonly termed a four-way valve. The spool 57 of this valve is disposed for sliding movement in a valve body 58 having an inlet port 60, a pair of work ports 61 and 62 and a pair of exhaust ports 63, the latter ports communicating with a single exhaust conduit 64 which leads to a reservoir 65. This reservoir forms part of a fluid pressure source 66 having a motor driven pump 67 the inlet of which is connected by line 68 with the reservoir 65 and the outlet is connected by a line 70 with the inlet port 60 of the valve 55. Line 70 contains a relief valve 71 to limit the pressure developed by the pump 67 to be controlled and exhaust line 72 extends from the valve 71 to the reservoir 65 to permit excessive fluid to be returned thereto.

Spool 57 has spaced heads 73 and 74 which cooperate with ports 61 and 62 to control the communication thereof with the inlet port 60 and outlet ports 63. The spool 57 is shown in centered position in Fig. 6. In this position the work ports 61 and 62 are blocked so that fluid motor 75 will be maintained idle. To effect the movement of spool 57 an extension 78 on this spool projects into the casing 56 and is supported for longitudinal movement therein. This extension is provided with bearings 80 to rotatably support a gear 81, this gear corresponding to the gear 33 in the first form of the invention. This gear meshes with gears 82 and 83 the former being carried by a shaft 84 which is driven by a fluid motor or other prime mover 85. Gear 83 is carried by a shaft 86 journalled in the casing 56, shaft 86 being driven by fluid motor 75. This fluid motor corresponds to fluid motor 37 in the first form of the invention.

The control shown in Figs. 5, 6, and 7 operates in a manner similar to the control in the first form of the invention, that is, when operation of gear 82 is initiated the resistance to turning movement of gear 81 offered by gear 83 will cause gear 81 to move laterally and in so moving it will actuate valve 55 to initiate fluid flow to motor 75, then, when this motor operates, it will cause the rotation of gear 83 and the operation of the mechanism driven by motor 75. As long as the speed of operation of gear 83 does not exceed the proportional rate of operation of gear 82 valve 55 will remain in position to direct fluid from the source to motor 75. As in the first form of the invention, however, when the power required of motor 75 decreases and this motor tends to drive motor 85 through the gear train, 81, 82 and 83, gear 81 will move laterally to actuated spool 57 to decrease the flow of fluid to fluid motor 75 thus causing the rate of operation of this motor to decrease. It should be noted at this time that if the direction of rotation of fluid motor 85 should be reversed, gear 81 would be moved laterally in the direction opposite to that described above. This movement in the opposite direction will, of course, move the valve spool in the opposite direction reversing the work port and inlet and outlet connections above described. The result will be the reverse operation of the motor 75 under the same control as before, the pattern of operation being dictated by the motor 85.

Fig. 5 shows a hydraulic circuit for the pilot motor 85. This circuit includes a power source 87 having a motor driven pump 88, a reservoir 89 with which inlet line 90 communicates, an outlet line 91 which extends from the pump 88 to the motor 85 and an exhaust line 92 extending from motor 85 to the reservoir 89. Line 91 contains a relief valve 93 for controlling the pressure developed by the pump 88 and a flow control valve 94 for governing the operation of the motor 85. Manually actuated or suitable mechanically actuated mechanism may be provided to operate the flow control valve 94 to cause the motor 85 to follow a predetermined plan or pattern of operation. It will be obvious that through the control mechanism shown and described motor 75 will be caused to follow the same plan or pattern of operation performed by the motor 85.

Further objects and advantages of the present invention will be apparent from the following description, reference being had to the accompanying drawings wherein a preferred form of embodiment of the invention is clearly shown.

I claim:

1. Control mechanism for a hydraulic power transmitting system of the type having a fluid motor comprising a casing; a pair of gears journalled in said casing, one of said gears being connected for operation with said fluid motor, the other gear of said pair of gears being formed for connection with a controlled driving mechanism; a third gear disposed in meshing relationship with said pair of gears; a body for supporting said third gear, said body providing for relative movement between said third gear and said body; and a plurality of valve ports in said body, one of said ports being connected with a source of fluid under pressure and the inlet of said fluid motor and another being connected with the outlet of said fluid motor, movement of said gear relative to said body serving to vary fluid flow through said valve ports and the quantity of fluid flow to said motor.

2. Control valve mechanism for a hydraulic power unit comprising a body for rotatably supporting a gear element, said body having a fluid passage terminating in a port, the axis of rotation of said gear being movable relative to said body to cause said gear to alternately open and close said port; and another gear element in meshing engagement with the first-mentioned gear, the reaction between said gears serving to move the axis of rotation of said first-mentioned gear on said body.

3. Control valve mechanism for a hydraulic power unit comprising a body for rotatably supporting a gear element, said body having fluid passages terminating in oppositely directed ports, the axis of rotation of said gear being movable relative to said body to cause said gear to alternately open and close said ports; and a plurality of gear elements in meshing engagement with the first-mentioned gear, the gears of said plurality being disposed relative to the first-mentioned gear to cause the axis of rotation thereof to move in opposite directions in response to reactions due to tendencies to rotate at different rates.

References Cited in the file of this patent

UNITED STATES PATENTS

| | | |
|---|---|---|
| 109,013 | Huntoon | Nov. 8, 1870 |
| 603,038 | Harfield | Apr. 26, 1898 |
| 1,119,324 | Sprater | Dec. 1, 1914 |
| 1,749,569 | de Florez | Mar. 4, 1930 |
| 1,886,975 | Profitlich | Nov. 8, 1932 |
| 2,331,218 | Montelius | Oct. 5, 1943 |
| 2,516,842 | Baker | Aug. 1, 1950 |
| 2,622,532 | Hamill | Dec. 23, 1952 |